United States Patent [19]

Mairot

[11] Patent Number: 4,694,922

[45] Date of Patent: Sep. 22, 1987

[54] INSTRUMENT FOR MEASURING AND RECORDING FORCES

[75] Inventor: Guy Mairot, Vétraz-Monthoux, France

[73] Assignee: S.c.a.i.m.e., Annemasse, France

[21] Appl. No.: 814,200

[22] Filed: Dec. 27, 1985

[30] Foreign Application Priority Data

Jan. 17, 1985 [CH] Switzerland ............................ 244/85

[51] Int. Cl.⁴ ............................................ G01G 23/32
[52] U.S. Cl. .................................... 177/178; 364/567; 177/25
[58] Field of Search ............................ 177/178, 25.19; 364/567

[56] References Cited

U.S. PATENT DOCUMENTS 4,301,879 11/1981 Dubow ............................ 177/178 X
4,629,015 12/1986 Fried et al. ...................... 177/178 X

*Primary Examiner*—George H. Miller, Jr.
*Attorney, Agent, or Firm*—Ladas & Parry

[57] ABSTRACT

A force-measuring device (1) supplies measured force values electrically to a control and calculating device (2). The latter stores the values received in this way and calculates sliding averages therefrom; it controls a display device (3) whose purpose is to give a graphical display of the successive values measured by the force-measuring device (1), or of the successive sliding averages of these successive measured values.

The instrument has the advantage of visualizing the variation of a force with time, which is very useful in the case of the force developed by a user on a physical training apparatus, or in the case of the change of the weight of a subject with time.

4 Claims, 4 Drawing Figures

INSTRUMENT FOR MEASURING AND RECORDING FORCES

BACKGROUND OF THE INVENTION

Instruments for measuring forces such as weights are already known which comprise a device for storing the measured weights (for example the successive weights of a person over a certain period of time) and for determining the difference relative to a given weight value (set value or ideal value). However, these known instruments are only capable of indicating values of the numerical difference between the measured value and a reference value, which is inadequate, especially in the case of bathroom scales, because what is useful to the user - and his doctor - is not so much the value of such a difference as the ability to observe and evalute the change in the successively measured values over a certain period of time.

The object of the present invention is to provide an instrument for measuring and recording forces -especially but not exclusively weights - which is capable of showing, in graphical form, the change in the value of the successively measured forces (weights) over a given period of time (for example a week, a month, three months or a year).

BRIEF DESCRIPTION OF THE DRAWINGS

The attached drawing shows, diagrammatically and by way of example, and embodiment of the instrument according to the invention.

THE INVENTION

Figure 1:
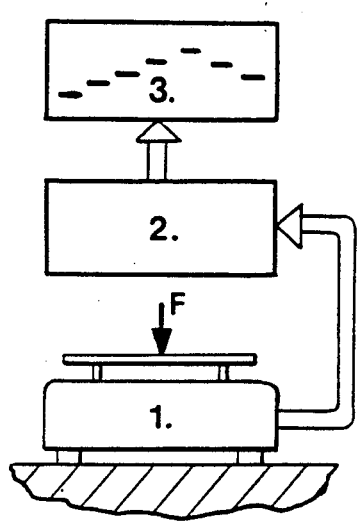
FIG. 1 is a general view of the instrument.

The instrument illustrated diagrammatically in FIG. 1 comprises a device 1 for measuring a force F applied to it. This may be bathroom scales, for example, in which case the force F is the present weight of the person standing on the weighing platform.

It also comprises a control and calculating device 2 which is functionally linked to the device 1; the successive values of the forces (weights) measured by the device 1 are communicated electrically to the device 2.

It further comprises a graphical display device 3, controlled by the device 2, for providing the user with a graphical representation of the present value of his weight and the change in his weight over a certain period of time (for example a week, a month, three months or a year) prior to the last measurement made.

Figure 2:
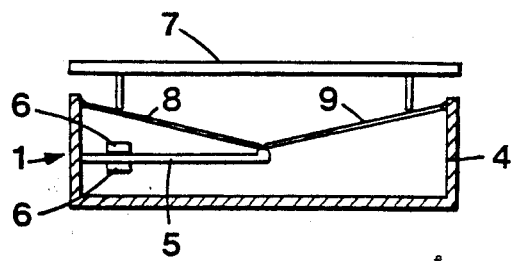
FIG. 2 is a diagrammatic cutaway view of the force-measuring device forming part of the instrument according to FIG. 1.

Supposing that the device 1 is bathroom scales in this example, FIG. 2, which is a very diagrammatic cutaway view thereof, shows a stand 4 incorporating a transducer carrying stress gauges, which is in the form of a deflection beam 5 fixed at one end in the stand 4, the other end being free. Some of the stress gauges indicated by 6 are fixed to the upper face of the beam 5 and others are fixed to the lower face. The arrangement of these gauges, of which there are four, will be indicated below.

The scales illustrated in FIG. 2 comprise a weighing platform 7 for receiving the person wishing to weigh himself. Via levers 8, 9, this platform acts on the beam 5 at a point near its free end.

It is understood without further explanation that the device 1 supplies the device 2, in electrical and analog form, with the value of each weight placed on its weighing platform 7.

The control and calculating device 2 will now be described, together with its operation.

A direct-current voltage source supplying the whole of the instrument is shown by 10. The four stress gauges (6 in FIG. 2) are indicated by 6a, 6b, 6c, 6d. As can be seen, they are connected up electrically to form a resistance bridge 11. The bridge 11, a transistor 12, an operational amplifier 13 and its negative feedback resistor 14, together with a circuit 15 which, linked with a microprocessor 16, constitutes an analog/digital converter, make it possible to convert the loads applied to the platform 7 into digital values, enabling the subsequent processing which will be indicated below. The converter can be, for example, of the type described in French Pat. No. 798100582.

The purpose of the microprocessor 16 is to control the whole of the instrument's circuitry. It comprises a clock, program memories, data memories, a central unit for performing different arithmetic and logic operations, registers and links connected to external components and capable of controlling these components and/or receiving information originating from these components, as well be seen below. As all the elements of the microprocessor are well known to those skilled in the art, they have not been shown so as not to complicate the drawing unnecessarily.

The microprocessor 16 can be, for example, of the type UPD 7508A from N.E.C.

Figure 4:
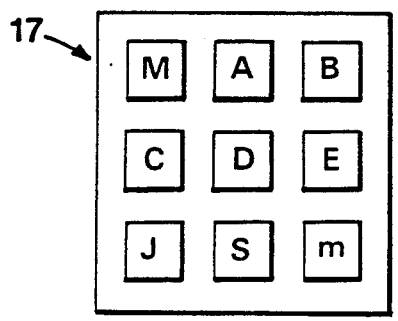
FIG. 4 shows, on a larger scale, the arrangement of the control keyboard which can be seen in FIG. 3.
Figure 3:
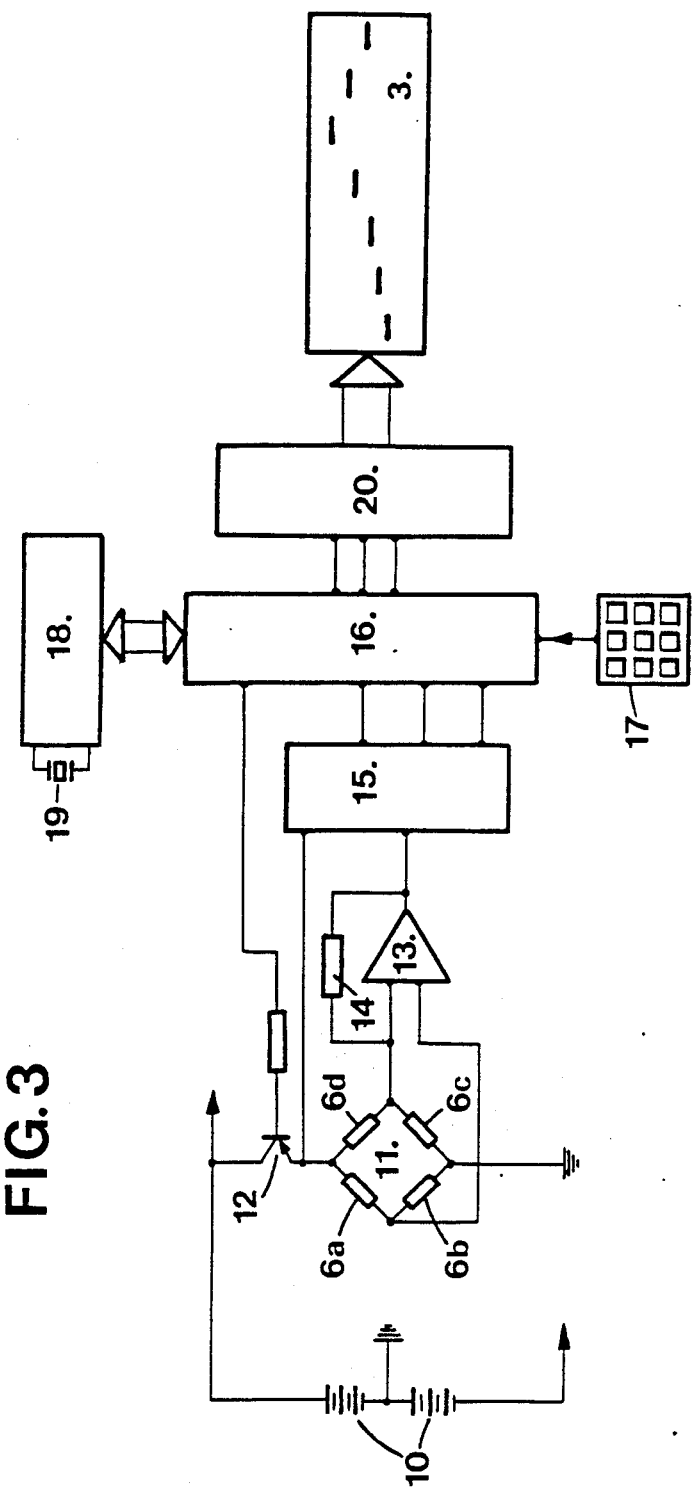
FIG. 3 is a block diagram of the electrical part of the force-measuring device according to FIG. 1 and of the control and calculating device forming part of the instrument according to FIG. 1.

A keyboard 17, working in conjunction with the microprocessor 16, makes it possible to enter a certain number of data, as will be indicated in the description of operation. This keyboard will be described below with reference to FIG. 4. It has keys A, B, C, D, E, corresponding to the different people able to use the instrument, and keys m, J, S, and a time management circuit 18 supplies the microprocessor 16 with the time and date corresponding to each weighing. This circuit 18 can be, for example, of the type UPD 1990 from N.E.C. It operates in conjunction with a time-base crystal 19.

The device 2 also comprises a circuit 20 connected to the microprocessor 16. This circuit, which can be of the type UPD 7225 from N.E.C., controls the graphical display device 3, which can be, for example, of the liquid crystal type.

The instrument operates as follows.

The programs of the different possible use modes of the instrument are stored in the program memories in the final manufacturing stage.

Before standing on the platform 7, the user switches the instrument on by pressing the key M on the keyboard 17. The instrument then sets itself automatically to zero and 0.0 appears on the readout 3, indicating that a weighing may commence; the user then stands on the platform and the result of the weighing appears as a numerical value on the readout 3. On the keyboard 17, the user then presses the particular key A, B, C, D or E assigned to him, thereby selecting a corresponding data storage area (in the example given, there are 5 data storage areas but this number could obviously be different). One data storage area is allocated to each individual. The weight present on the platform is then stored in the data memory of the microprocessor 16. This storage takes place in conjunction with the time management circuit 18.

In actual fact, for a given person, only one measurement is stored in 24 hours. If the same person weighs himself several times in 24 hours, only the last weighing is retained by the instrument.

To reveal the curve corresponding to the selected storage area, it is then necessary to press one of the keys J, S or m, which correspond respectively to the days, weeks and months.

Pressing the key J reveals on the readout 3 the curve corresponding to the weights recorded over the last 7 days.

Pressing the key S reveals on the readout 3 the curve corresponding to the average of the weights over the last 7 weeks. The weight value allocated to a particular week corresponds to the average of the weights recorded during the week in question.

Pressing the key m reveals on the readout 3 the curve corresponding to the averages of the weights over the last 7 months. The weight value allocated to a particular month corresponds to the average of the weights recorded during the month in question.

The averages referred to above are calculated by the microprocessor 16 and stored in the data memory of this microprocesser.

The measuring device 1 is placed on the ground. The control and calculating device 2 and the display device can either be built into the device 1 at the top of a column coming from the device 1, or be fixed together to a wall and connected to the device 1 electrically.

In the example shown in the drawing, the successive weights measured (in the case of a display for a period of a week) appear in the form of 7 short horizontal lines, each corresponding to a day. The last weight measured also appears as a numerical value in a corner of the screen.

If it is desired to look at the change in weight over a more extensive period of 7 successive weeks, the corresponding program calculates the average of the weighing for each week and displays the 7 average values of these last 7 weeks in the form of 7 short horizontal lines. Likewise, the monthly averages of the last 7 months can be displayed.

If the user wants to know the change in weight not simply in the form of successive values but relative to an ideal value corresponding to sex, age and height, he can enter this ideal value in the memory by means of a numeric keyboard (not shown), which will reveal, on the screen of the device 3, not only the weight curve but also a horizontal line representing the ideal weight, enabling the user to compare his weight with this ideal weight.

The analog/digital conversion can be effected either according to the decimal system or according to the English system, as desired.

The display device 3 could be a screen of the cathode ray tube type or a printer.

Although the example which has been shown and described relates to bathroom scales or baby scales, the invention is not restricted to a weight-measuring instrument. In general, the invention relates to the measurement of forces. Another example might involve measurement of the force developed on a physical training apparatus and graphical representation of successive measured values or averages of these values.

What is claimed is:

1. An instrument for measuring, registering and displaying forces, comprising
   force measuring means, a transducer for converting measured forces into electric signals, calculating means controlled by said transducer, a plurality of memories for registering successive values of the measured forces, graphic display means,
   said calculating means comprises an arrangement for calculating mean values of the measured forces within successive periods of time of different periodicities, the memories being provided for registering several series of successive values of force as a function of time, at least one of said series being formed by successive daily measured values of force, remaining series being formed each of successive mean values of measured forces calculated by said calculating means for a predetermined periodicity, controlling means being provided for actuating said display means for selectively displaying memorized values of forces of the n last measured values of the measured forces, and of the n last mean values of force calculated by said calculating means for each of said various periodicities.

2. An instrument according to claim 1, wherein said calculating means is provided for supplying to the memories the daily values and at least weekly and monthly mean values of the daily successively measured values of force.

3. An instrument according to claim 2, further comprising a time base for controlling said various periodicities of mean values of force to be memorized in the memories and displayed in said display means.

4. An instrument according to claim 3, comprising means for displaying simultaneously with memorized values of force an assigned value of force adapted for showing a possible discrepancy between the actual values and a preset value.

* * * * *